United States Patent [19]
Szczypski

[11] Patent Number: 5,941,550
[45] Date of Patent: *Aug. 24, 1999

[54] TRAILER HITCH ASSEMBLY

[75] Inventor: Michael J. Szczypski, South Bend, Ind.

[73] Assignee: One Step, Inc., South Bend, Ind.

[ * ] Notice: This patent is subject to a terminal disclaimer.

[21] Appl. No.: 09/152,599

[22] Filed: Sep. 14, 1998

Related U.S. Application Data

[63] Continuation of application No. 08/717,077, Oct. 3, 1996, Pat. No. 5,806,872.

[51] Int. Cl.⁶ ................................................... B60D 1/42
[52] U.S. Cl. ..................................... 280/479.2; 280/491.2
[58] Field of Search ................................ 280/477, 478.1, 280/479.2, 479.3, 491.1, 491.2

[56] References Cited

U.S. PATENT DOCUMENTS

| | | | |
|---|---|---|---|
| 3,093,395 | 6/1963 | Boutwell | 280/478 |
| 3,126,210 | 3/1964 | Hill | 280/478 |
| 4,007,945 | 2/1977 | Casad et al. | 280/478 B |
| 4,558,883 | 12/1985 | Bouma | 280/478.1 |
| 4,792,153 | 12/1988 | Gaaldes | 280/478.1 |
| 4,944,525 | 7/1990 | Landry | 280/479.3 |
| 4,951,957 | 8/1990 | Gullickson | 280/479.2 |
| 5,067,742 | 11/1991 | Relja | 280/497.2 |
| 5,213,354 | 5/1993 | Vaughn | 280/479.2 |
| 5,236,214 | 8/1993 | Taylor | 280/402 |
| 5,277,447 | 1/1994 | Blaser | 280/479.2 |
| 5,288,095 | 2/1994 | Swindall | 280/479.2 |
| 5,322,315 | 6/1994 | Carsten | 280/479.2 |
| 5,342,076 | 8/1994 | Swindall | 280/479.2 |
| 5,423,566 | 6/1995 | Warrington et al. | 280/415.1 |
| 5,547,210 | 8/1996 | Dugger | 280/477 |

OTHER PUBLICATIONS

Northern Hydraulics Catalog, Inc., Fall/Winter Master Catalog, p. 167.
Sales Flier by PRO–hitch Manufacturing, Inc. for PRO–hitch.
Sales Flier by Rosemonte Manufacturing, Inc. for MASTERHITCH.

Primary Examiner—Kevin Hurley
Attorney, Agent, or Firm—Taylor & Associates, P.C.

[57] ABSTRACT

The invention is directed to a trailer hitch assembly for connecting a vehicle with a trailer. The trailer hitch assembly includes a slide tube which is configured for connection with the vehicle. The slide tube includes a first opening therein. A collar is disposed around and slidingly carried by the slide tube. The collar includes a second opening therein and an arcuate slot disposed in communication with the second opening. A pivot arm is pivotally connected at one end thereof to the collar. The pivot arm includes a third opening therein. A tongue is connected to an end of the pivot arm opposing the one end. A pin is carried by the pivot arm and is disposed within each of the third opening of the pivot arm and the arcuate slot of the collar.

4 Claims, 4 Drawing Sheets

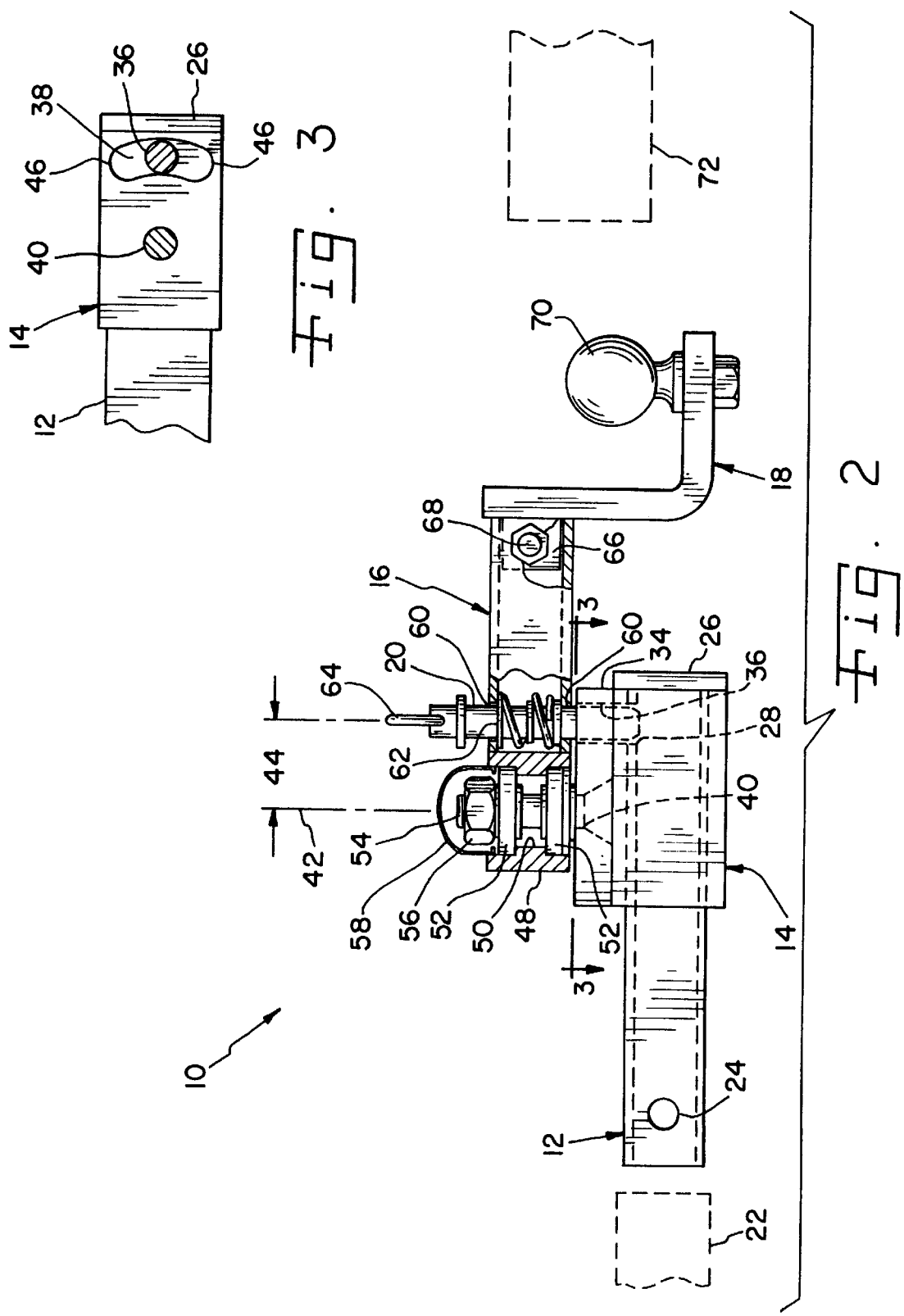

TRAILER HITCH ASSEMBLY

This is a continuation of application Ser. No. 08/717,077, filed Oct. 3, 1996, now U.S. Pat. No. 5,806,872.

BACKGROUND OF THE INVENTION

1. Field of the Invention

The present invention relates to a trailer hitch assembly, and, more particularly, to a trailer hitch assembly which is removably attachable to a receiver tube at the rear of a vehicle.

2. Description of the Related Art

A hitch assembly for a vehicle typically includes an L-shaped drop which is attached to a projection. The projection is sized and configured to be received within a receiver channel at the rear of the vehicle. The trailer hitch is normally positioned out of the sight of the driver, such that it is difficult if not nearly impossible to align the hitch properly relative to the tongue of the trailer. For this reason, usually one person drives the vehicle and another person is positioned at the tongue of the trailer to direct the driver regarding placement of the hitch relative to the trailer. Alternatively, the driver may repeatedly enter and exit the vehicle to view the hitch connection in an effort to properly position the vehicle relative to the trailer.

It is known to provide a hitch assembly which includes two arms which slide and pivot relative to each other. One of the arms is received within the receiver channel of the vehicle, and is pivotally connected to a collar. The collar in turn slidably supports the other arm which is attached to the tongue for connection with the trailer. A problem with such a hitch assembly is that when a trailer is connected to the arm sliding within the collar, a large moment arm is created between the collar and tongue which makes it nearly impossible to slide the second arm relative to the collar. Moreover, the collar is simply bolted to the arm attached to the vehicle. With the weight of the trailer connected to such a hitch assembly, it is very difficult to effect the pivotal movement between the collar and the arm. Such pivotal movement is also further hindered by the large moment arm created on the second arm upon attachment with the trailer. Additionally, such a hitch assembly requires that the vehicle be backed up in order to lock the collar and arms together. If the arm connected to the trailer is already rotated to the side, backing the trailer in a straight direction will not return the two arms in substantially parallel alignment with each other.

What is needed in the art is a trailer hitch assembly which allows a single person to relatively easily and reliably connect the tongue of a trailer to the hitch assembly.

SUMMARY OF THE INVENTION

The present invention provides a trailer hitch assembly including a slide tube attachable to a vehicle and a pivot arm which both slides and pivots relative to the slide tube. An arcuate slot formed in a collar interconnecting the slide tube with the pivot arm limits the relative pivotal movement between the pivot arm and slide tube. A reduced friction pivot device in the form of a bearing assembly allows for easier pivotal movement between the pivot arm and slide tube.

The invention comprises, in one form thereof, a trailer hitch assembly for connecting a vehicle with a trailer. The trailer hitch assembly includes a slide tube which is configured for connection with the vehicle. The slide tube includes a first opening therein. A collar is disposed around and slidingly carried by the slide tube. The collar includes a second opening therein and an arcuate slot disposed in communication with the second opening. A pivot arm is pivotally connected at one end thereof to the collar. The pivot arm includes a third opening therein. A tongue is connected to an end of the pivot arm opposing the one end. A pin is carried by the pivot arm and is disposed within each of the third opening of the pivot arm and the arcuate slot of the collar.

The invention comprises, in another form thereof, a trailer hitch assembly for connecting a vehicle with a trailer. The trailer hitch assembly includes a slide tube which is configured for connection with the vehicle. A collar is disposed around and slidingly carried by the slide tube. The collar includes a hole therein. A pivot arm is pivotally connected at one end thereof to the collar. The pivot arm includes a raceway opening therein at the one end. A tongue is connected to an end of the pivot arm opposing the one end. A pivot device such as a bearing assembly, disposed within the raceway opening of the pivot arm, provides a reduced friction pivoting action between the pivot arm and the collar. An elongated member is pivotally carried by the pivot device and disposed within the hole in the collar.

An advantage of the present invention is that relative pivotal movement between the pivot arm and slide tube is limited.

Another advantage is that relative pivotal movement between the pivot arm and slide tube is easier using a reduced friction pivot device such as a bearing assembly.

Yet another advantage is that after the trailer is connected to the vehicle, the pivot arm may be locked into place relative to the slide tube by simply moving the vehicle in a forward direction.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 2 is a side, partially sectioned and fragmented view of the trailer hitch assembly shown in FIG. 1;

FIG. 3 is a sectional view taken along line 3—3 in FIG. 2;

Corresponding reference characters indicate corresponding parts throughout the several views. The exemplifications set out herein illustrate one preferred embodiment of the invention, in one form, and such exemplifications are not to be construed as limiting the scope of the invention in any manner.

DETAILED DESCRIPTION OF THE INVENTION

Figure 1:
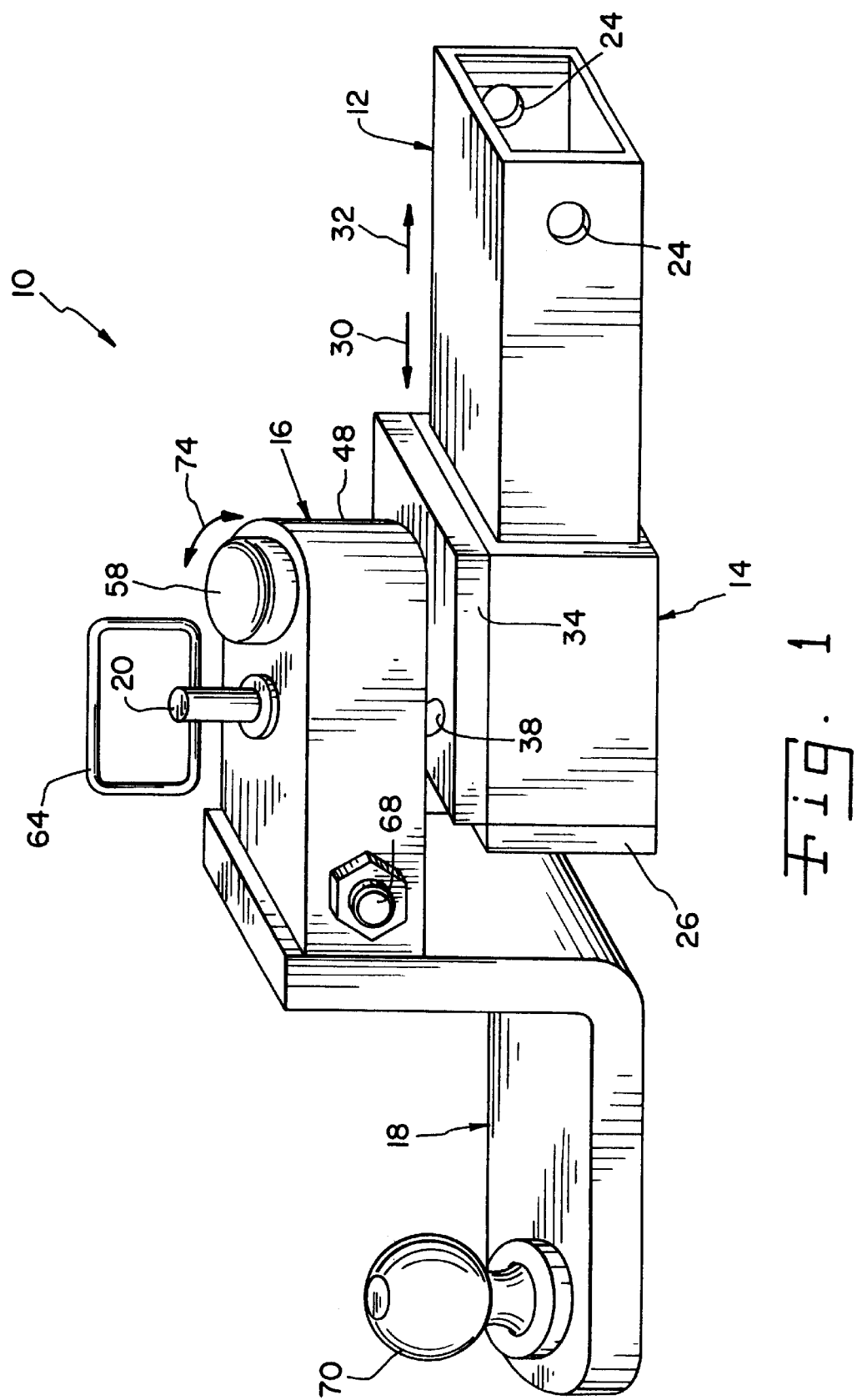
FIG. 1 is a perspective view of one embodiment of a trailer hitch assembly of the present invention.

Referring now to the drawings, and more particularly to FIGS. 1–3, there is shown an embodiment of a trailer hitch assembly 10 of the present invention. Trailer hitch assembly 10 generally includes a slide tube 12, a collar 14, a pivot arm 16, a tongue 18 and a pin 20.

Slide tube 12 is configured for connection with a vehicle. In the particular embodiment shown, slide tube 12 is configured for connection with a conventional two-inch receiver channel 22 (shown in dashed lines in FIG. 2), which in turn is connected to the frame of the vehicle. Slide tube 12 includes a pair of substantially aligned holes 24 at the end thereof which is attached to the vehicle. A pin (not shown) passes through each of receiver channel 22 and holes 24 to attach slide tube 12 to receiver channel 22 in known manner. A plate 26 defining a stop is attached to an end of slide tube 12 which is generally opposite from the end including holes 24. Slide tube 12 also includes a first opening 28 therein at the end adjacent plate 26.

Collar 14 is disposed around and slidingly carried by slide tube 12. Collar 14 is slidingly movable relative to slide tube 12 in directions substantially parallel with the longitudinal extension of slide tube 12, as indicated by directional arrows 30 and 32. Collar 14 includes a top plate 34 having a second opening 36 (FIGS. 2 and 3) and an arcuate slot 38 formed therein. Second opening 36 is positioned in top plate 34 to be in substantially coaxial alignment with first opening 28 when collar 14 is against plate 26. Arcuate slot 38 is disposed in communication with second opening 36, and limits pivotal movement between pivot arm 16 and collar 14, as will be described in more detail hereinafter. Collar 14 also includes a hole 40 defining a pivot axis 42. Arcuate slot 38 has a radius of curvature 44 with a center point lying substantially coincident with pivot axis 42. Arcuate slot 38 extends partially through top plate 34, and faces pivot arm 16. Arcuate slot 38 is positioned relative to second opening 36 such that second opening 36 is substantially centrally located relative to opposing ends 46.

Pivot arm 16 is pivotally connected at an end 48 thereof to collar 14. More particularly, pivot arm 16 includes a raceway opening 50 in which is disposed a reduced friction pivot device providing a reduced friction pivoting action between pivot arm 16 and collar 14. In the embodiment shown, the reduced friction pivot device is in the form of two roller bearing assemblies 52. However, it is also to be understood that the reduced friction pivot device may be in the form of other structures providing easier pivoting action between pivot arm 16 and collar 14, such as a brass or bronze bushing or other type of reduced friction bearing. An elongated member 54, in the form of a bolt in the embodiment shown, is pivotally carried by bearing assemblies 52 and disposed within hole 40 of collar 14. Bolt 54 may include a panhead at one end thereof as shown in phantom lines in FIG. 2, and is secured using a conventional lock nut 56. A cap 58 sealingly engages raceway 50 and prevents foreign matter such as dirt, water, etc., from entering bearing assemblies 52.

Pivot arm 16 also carries pin 20. More particularly, pivot arm 16 includes third openings 60 therein, in which pin 20 is disposed. A compression spring 62 engages an upper wall of pivot arm 16 and a stop in the form of a washer (shown but not numbered), roller pin, etc. attached to pin 20, such that pin 20 is biased toward collar 14. A handle 64 attached to pin 20 allows pin 20 to be moved in a longitudinal direction.

Tongue 18 is removably connected to an end of pivot arm 16 which is opposite from end 48. Tongue 18 includes a projection 66 which extends into pivot arm 16, as shown in FIG. 2. A bolt 68 passes through pivot arm 16 and projection 66, and thereby connects tongue 18 to pivot arm 16. Tongue 18 includes an opening (not numbered) therein which may be used to attach a conventional hitch ball 70 thereto. Hitch ball 70 may be received within a corresponding female recess of a trailer tongue 72 represented by dashed lines in FIG. 2.

In the embodiment shown, tongue 18 is a conventional drop for attachment with a trailer ball 70. However, it is also to be understood that tongue 18 may be in the form of an adjustable drop, or may be another type of modular extension from pivot arm 16, such as a bike rack or the like.

To connect hitch assembly 10 to a tongue 72 of a trailer, the vehicle is positioned such that tongue 18 is located within several inches from tongue 72 of the trailer. More particularly, tongue 18 must be positioned relative to tongue 72 of the trailer, dependent upon the distance which collar 14 may slide relative to slide tube 12, and the length of pivot arm 16 and the lower extension portion of tongue 18. Pin 20 is then moved in an upward direction using handle 64 until the stop on pin 20 prevents further upward movement. In the upward position, the bottom end of pin 20 is disposed slightly above second opening 36 in top plate 34, but still within arcuate slot 38. Pin 36 is thus disposed within each of third openings 60 formed in pivot arm 16 and arcuate slot 38 formed in top plate 34. Since pin 20 is not disposed within either of second opening 36 of collar 14 or first opening 28 of slide tube 12, collar 14 may be slid relative to slide tube 12 and pivot arm 16 may be pivoted relative to collar 14 (as indicated by directional arrows 30, 32 and 74). Pivotal movement of pivot arm 16 relative to collar 14 is limited when pin 20 disposed within arcuate slot 38 engages either one of the ends 46 of arcuate slot 38, depending upon the particular direction of rotation of pivot arm 16. Ball 70 is positioned in substantial alignment with the recess in tongue 72 of the trailer by the sliding action of collar 14 and the pivotal action of pivot arm 16, and tongue 18 is thereafter connected to tongue 72 of the trailer. The user then moves the vehicle in a forward direction, which in turn moves collar 14 toward plate 26 as indicated by arrow 30, and simultaneously rotates pivot arm 16 into substantially parallel alignment with slide tube 12. When collar 14 is against plate 26 and pivot arm 16 is in substantially parallel alignment with slide tube 12, each of the first opening 28, second opening 36 and third openings 60 are likewise disposed substantially in alignment with each other, thereby allowing pin 20 to drop into each of openings 28, 36 and 60 under the bias of spring 62. The trailer is thus connected to hitch assembly 10 and the various parts forming hitch assembly 10 are locked into place relative to each other.

Figure 4:
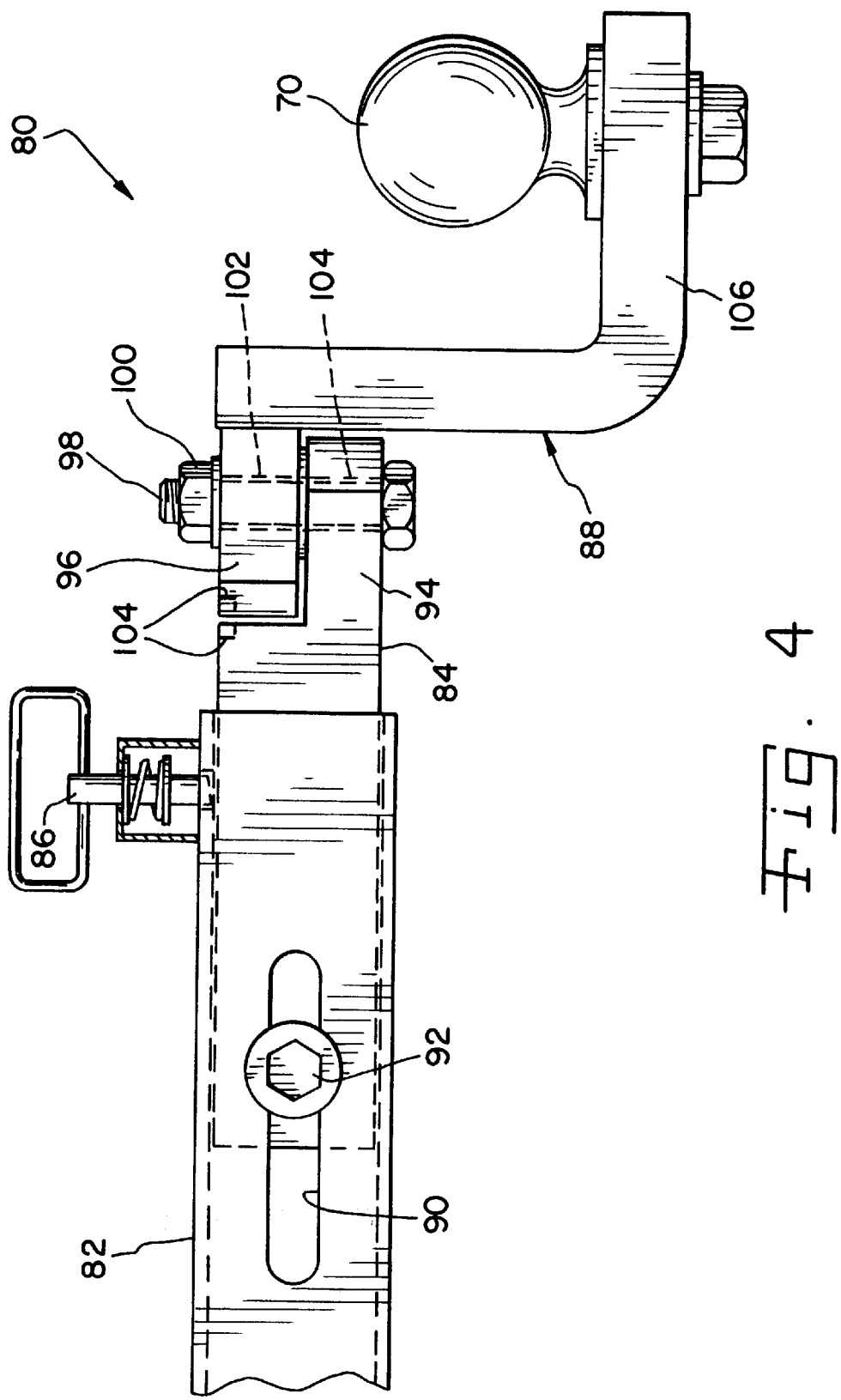
FIG. 4 is a side view of another embodiment of a trailer hitch assembly of the present invention.
Figure 5:
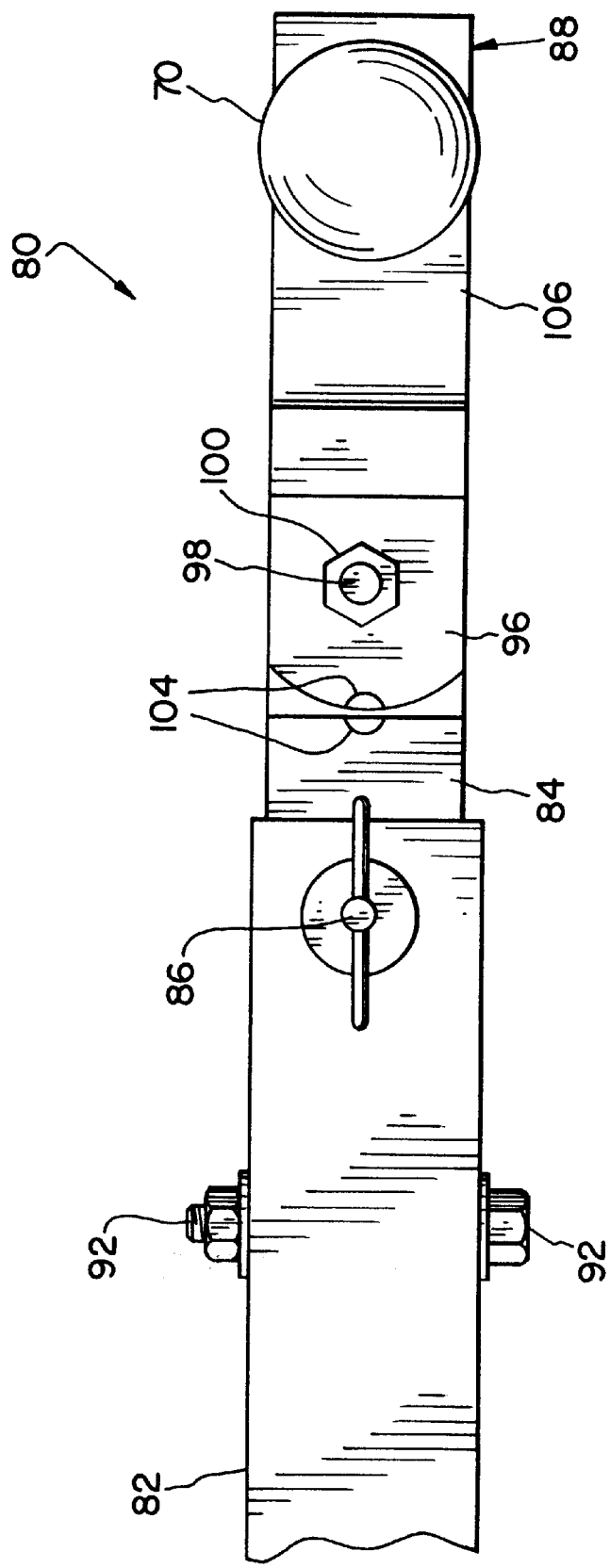
FIG. 5 is a top view of the trailer hitch assembly shown in FIG. 4.

Referring now to FIGS. 4 and 5, there is shown another embodiment of a trailer hitch assembly 80 of the present invention. Trailer hitch assembly 80 is similar to trailer hitch assembly 10 shown in FIGS. 1–3 in many respects, and includes a slide tube 82, an arm 84, spring loaded pin 86 and tongue 88. Slide tube 82 includes a pair of slots 90 in each side wall thereof, one of which is shown in FIG. 4. A bolt 92 extends through arm 84 and is slidably disposed within each of slots 90. Arm 84 is thus slidingly movable in a longitudinal direction within slide tube 82. Slide tube 82 may be attached to the vehicle, such as by inserting slide tube 82 in a conventional receiver channel. Arm 84 includes a pivot portion 94 which pivotally engages a mating pivot portion 96 which is attached to and extends from tongue 88. A bolt 98 passes through each of pivot portions 94 and 96 and is threadingly engaged with a lock nut 100 to pivotally connect arm 84 with tongue 88. A friction reducing pivot device in the form of bushings 102, 104 allow easier pivotal movement between arm 84 and tongue 88.

Each of arm 84 and pivot portion 96 of tongue 88 include a semi-circular hole 104 formed therein. Spring loaded pin 86 snaps into place within hole 104 when arm 84 is slid fully within slide tube 82 and a lower portion 106 of tongue 88 is positioned substantially parallel to slide tube 82.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A trailer hitch assembly for connecting a vehicle with a trailer, said trailer hitch assembly comprising:
   a tube assembly configured for connection with the vehicle;
   a pivot device which is pivotally connected to said tube assembly, one of said tube assembly and said pivot device having an opening, an other of said tube assembly and said pivot device having an arcuate slot disposed in communication with said opening;
   a tongue connected to said pivot device; and
   a pin disposed within each of said opening and said arcuate slot.

2. A trailer hitch assembly for connecting a vehicle with a trailer, said trailer hitch assembly comprising:
   a tube assembly configured for connection with the vehicle, said tube assembly having a hole therein;
   a pivot device which is pivotally connected to said tube assembly, said pivot device including a raceway opening therein;
   a tongue connected to said pivot device;
   at least one bearing assembly, disposed within said raceway opening of said pivot device, for providing a reduced friction pivoting action between said pivot device and said tube assembly; and
   an elongated member being pivotally carried by said at least one bearing assembly and disposed within said hole in said tube assembly.

3. The trailer hitch assembly of claim 2, wherein said at least one bearing assembly comprises at least one bushing.

4. A method of hitching a tongue of a trailer to a vehicle, said method comprising the steps of:
   providing a tube assembly which is connected with the vehicle at one end thereof;
   providing a pivot device which is pivotally connected to said tube assembly, said pivot device including a tongue, one of said tube assembly and said pivot device including an opening therein, another of said tube assembly and said pivot device including an arcuate slot disposed in communication with said opening;
   positioning the vehicle such that the tongue of the pivot device is within several inches from the tongue of the trailer;
   adjusting the length of the tube assembly and pivoting the pivot device relative to the tube assembly such that the tongue of the pivot device is substantially aligned with the tongue of the trailer;
   limiting said pivoting of the pivot device using said arcuate slot;
   connecting the tongue of the pivot device with the tongue of the trailer;
   moving the vehicle in a forward direction to thereby maximize the length of the tube assembly and move the tongue of the pivot device in substantially parallel alignment with the tube assembly; and
   placing a pin within each of said opening and said arcuate slot.

* * * * *